United States Patent [19]

Heuschkel et al.

[11] Patent Number: 5,509,851
[45] Date of Patent: Apr. 23, 1996

[54] MOISTURE-COLLECTING HOOD ASSEMBLY

[75] Inventors: Albert V. Heuschkel, Skillman; Joseph W. Kaczorek, Neshanic Station; Edward M. Olbrick, Ewing, all of N.J.

[73] Assignee: AT&T Corp., Murray Hill, N.J.

[21] Appl. No.: 348,008

[22] Filed: Dec. 1, 1994

[51] Int. Cl.⁶ .................................................. B08B 15/02
[52] U.S. Cl. ........................................ 454/67; 126/299 D
[58] Field of Search .......................... 126/299 R, 299 D; 454/49, 67

[56] References Cited

U.S. PATENT DOCUMENTS

| | | | |
|---|---|---|---|
| 1,732,315 | 10/1929 | Ray | 126/299 D |
| 2,548,406 | 4/1951 | Sonntag | 126/299 D |
| 3,628,311 | 12/1971 | Costarella et al. | 454/67 X |
| 3,827,343 | 8/1974 | Darm | 454/67 X |
| 3,865,022 | 2/1975 | Ahlerich | 126/299 D |
| 3,911,895 | 10/1975 | Van Schoyck | 454/67 X |
| 4,500,331 | 2/1985 | Cheng | 126/299 D X |
| 5,228,428 | 7/1993 | Jang | 126/299 D |

Primary Examiner—Harold Joyce
Attorney, Agent, or Firm—R. B. Levy; R. D. Slusky

[57] ABSTRACT

A moisture-collecting hood assembly (10) for a vapor-generating machine (12) includes a hood (14) having an open bottom (15) and upwardly tapering sides (16) and ends (18). On the inside of the hood is a gutter (24) for collecting moisture in the vapor condensing on the hood interior. Vapors from the machine that enter the hood are exhausted through a horizontally-oriented, moisture-collecting sleeve that has a central portion (46) whose cross-sectional area is larger than that of an inlet (43) in communication with the hood, and an outlet (48) in communication with a negatively pressurized exhaust line (49). The central portion of the sleeve serves to collect moisture in its lower portion that condenses from the vapor exhausted from the hood.

6 Claims, 1 Drawing Sheet

5,509,851

1

MOISTURE-COLLECTING HOOD ASSEMBLY

TECHNICAL FIELD

This invention relates to a hood for exhausting vapors from a piece of manufacturing equipment (e.g., a spray flux applicator), and for collecting moisture condensing from the vapor.

BACKGROUND ART

Various types of manufacturing equipment generate vapors during operation. For example, solder flux applicators that spray soldering flux on circuit boards generate flux vapors. For environmental reasons, it is desirable to exhaust the vapors. Accordingly, most solder flux applicators include a hood overlying the applicator. The hood is connected to an exhaust line having a negative pressure. In this way, flux vapors emanating from the flux applicator are evacuated through the hood and into the exhaust line.

Most soldering flux that is sprayed on circuit boards comprises an alcohol solvent having a small amount of solids dissolved therein. During spraying, the alcohol in the flux evaporates. Because of its low vapor pressure, the evaporated alcohol in the flux vapors exhausted through the hood does not condense on the hood and drip back onto the circuit board. However, there is a trend away from alcohol-based fluxes because of their high Volatile Organic Compounds (VOC) levels. Instead, many circuit board manufacturers now use water-based spray fluxes. Unfortunately, the water in such water-based spray fluxes does not evaporate nearly as quickly as the alcohol in an alcohol-based flux. Consequently, when spraying water-based flux, the vapor exhausted through the hood will contain moisture that condenses on the hood and drips back on the circuit board being sprayed. The condensed moisture that drips back on the circuit board alters its cosmetic appearance, usually requiring that the board be subjected to a cleaning operation which is undesirable.

Thus, there is a need to effectively exhaust water-based flux vapors away from the spray flux applicator while collecting condensing moisture to prevent the condensed moisture from dripping back on the board.

BRIEF SUMMARY OF THE INVENTION

Briefly, in accordance with the preferred embodiment, a moisture-collecting hood assembly is provided for exhausting vapors generated by a machine such as a solder flux applicator and for collecting moisture that condenses from the exhausted vapor. The moisture-collecting hood assembly of the invention comprises a hood having an open bottom and opposed sides and ends that taper upwardly from the bottom to a closed top. The opening at the bottom of the hood is sized to overlie the machine. Within the hood is a generally continuous gutter that runs substantially horizontally along the inside surface of each of the sides and ends. The gutter advantageously collects moisture that condenses on the inside of the hood. A first drainage means, typically in the form of a flexible tube, is coupled to a drainage port leading from the gutter for draining the collected moisture. An exhaust port extends into the hood through one of the sides above the level of the gutter for communication with the hood interior. The exhaust port, which tapers lightly downward from the hood, is coupled to a moisture-collecting means, typically in the form of a sleeve having a central portion and an opposed inlet and outlet, each having a smaller cross-sectional area than the central portion. The inlet of the moisture-collecting means is coupled to the hood exhaust port while the outlet is coupled to an upwardly tapering exhaust line having a negative pressure. In this way, the vapors in the hood are exhausted through the exhaust port and through the moisture-collecting means into the exhaust line. As the vapors are exhausted, moisture that condenses in the exhaust port and the exhaust line, as well as in the moisture-collecting means itself, will drain into the bottom of the central portion of the moisture-collecting means. A second drainage means, in the form of a drain trap coupled to a drain port at the bottom of the sleeve central portion, and a drain tube coupled to the drain trap are provided to drain the collected moisture in the moisture-collecting means.

DETAILED DESCRIPTION

Figure 1:
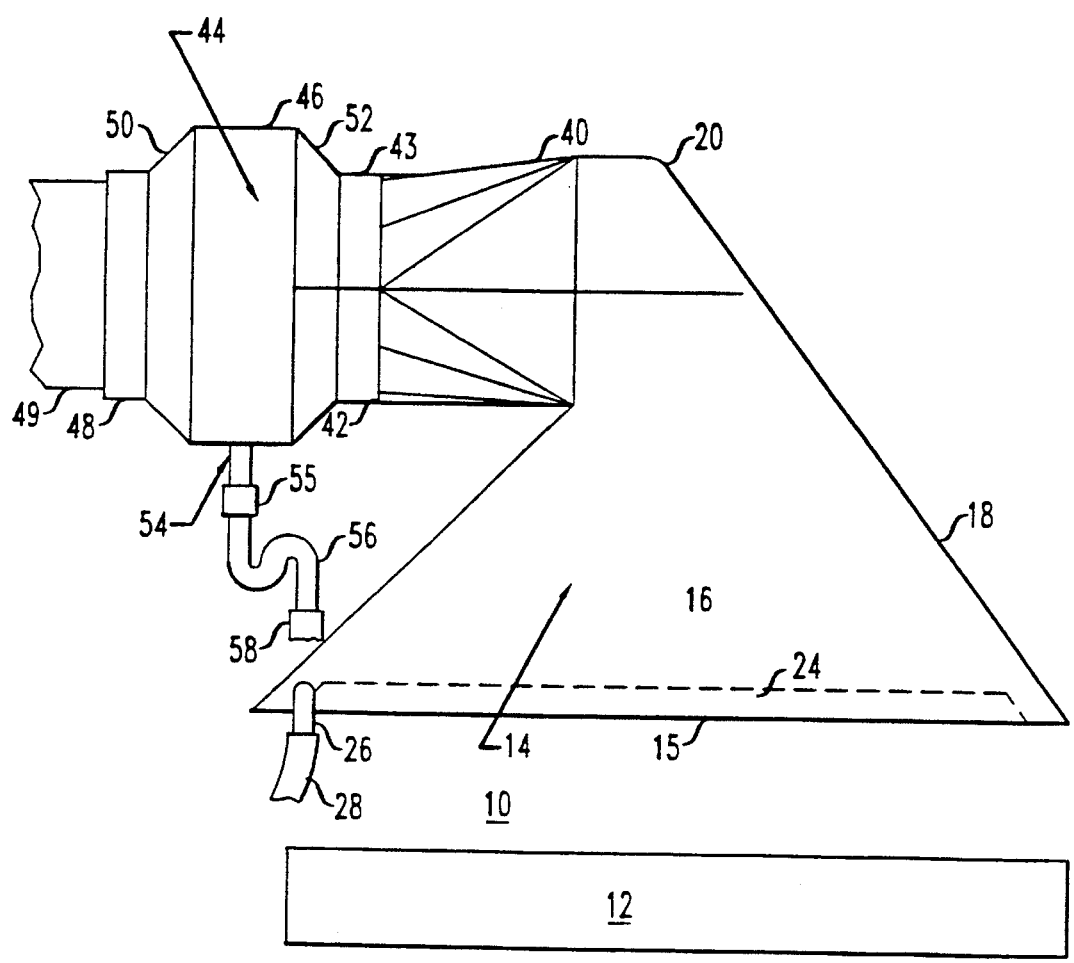
FIG. 1 is a side view of a moisture-collecting hood in accordance with the invention.

FIG. 1 depicts a moisture-collecting hood system 10, in accordance with the invention, for exhausting vapors from a machine 12, such as a spray flux applicator, and for collecting moisture condensing from the exhausted vapor. The hood system 10 comprises a hood 14 having an open bottom 15, and opposed sides 16 (only one shown) and ends 18 that taper upwardly from the bottom to a top 20. In practice, the sides 16 and ends 18 comprise trapezoidal stainless steel panels, one end being bent to form the top 20 so as to minimize the area thereof. The panels are joined at their edges by welding to yield a prismatic structure in which the bottom 15 is of an area significantly larger than the area of the top 20. The size of the panels forming the sides 16 and ends 18 is chosen so that the bottom 15 of the hood 14 is of a sufficient size to overlie the machine 12 when the hood is placed above it.

Running horizontally along the interior (non-exposed) surface of each of the sides 16 and the ends 18 is a gutter 24. In the illustrated embodiment, the gutter 24 on each side 16 and on each end 18 is formed by bending the bottom portion of the side and end, respectively, along each of a pair of horizontal bend lines spaced a short distance one above the other. When each of the sides 16 is joined at its edges to a separate one of the ends 18 by welding, the gutter 24 on each side is joined to the one on the adjacent end, forming a single generally continuous gutter. This continuous gutter 24 advantageously collects moisture that may condense on the interior of the hood 14 as moisture-containing vapor from the machine is drawn into the hood. The continuous gutter 24 has a drain port 26 that communicates therewith and extends horizontally outward through one of the sides 16. A drain tube 28 couples the drain port 26 to a drain (not shown). In this way, whatever moisture has collected in the continuous gutter 24 will drain therefrom through the tube 28 into the drain.

An exhaust port 40 extends into one of the ends 18 of the hood 14 just below the top 20 so as to taper slightly downward away from the hood. The exhaust port 40 has a relatively large opening 42 through which vapors entering the hood 14 from the machine 12 can be exhausted. The exhaust port 40 is coupled to an inlet 43 of a moisture-collecting sleeve 44 that is coaxial with the exhaust port so as to be generally horizontally oriented. The inlet 42 communicates with one end of a central portion 46 of the sleeve 44. The central sleeve portion 46 also communicates with an outlet 48 that is opposite the inlet. The outlet 48 is coupled to a negatively pressurized exhaust line 49 which slopes upwardly at a slight incline from the sleeve.

The central sleeve portion 46 has a larger cross-sectional area than both the inlet 43 and the outlet 48. To that end, the central sleeve portion 46 has a pair of integral transitional tapers 50 and 52 that join the inlet 43 and outlet 48, respectively. Because of its larger cross-sectional area, part of the central sleeve portion 46 will lie below the lowest portion of the inlet 43 and the outlet 48. In this way, the vapors in the hood 14 will be exhausted through the exhaust port 40, and any moisture that condenses in the port and the exhaust line 49, as well as in the sleeve itself, will drain into the bottom of the sleeve. A drain port 54 communicates with the bottom of the central sleeve portion 46 for draining the moisture collected in the lower portion of the sleeve. The drain port 54 is coupled via a connecting piece 5 to the upper end of the drain trap 56 whose lower end is coupled to a drain tube 58 that typically drains into the same drain as the drain tube 28. The drain trap 56 advantageously reduces the likelihood that moisture draining through the tube 58 will be drawn into the sleeve because of the negative pressure in the sleeve.

The foregoing describes a moisture-collecting hood assembly 10 that includes a hood 14 having a continuous gutter 24 therein for collecting moisture. In addition, the hood assembly 10 includes a sleeve 44 coupled to an exhaust port 40 through which vapors are exhausted from the hood 14. the gutter 24 and the sleeve 44 together collect that moisture that condenses from the vapor exhausted through the hood.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A moisture-collecting hood assembly comprising:

a hood having sides and ends that taper upwardly from an opening at the base of the hood, the opening in the hood overlying a vapor-generating machine;

a gutter inside of the hood that rims generally horizontally along the hood sides and ends for collecting moisture that may condense on the inside the hood;

a first drainage means coupled to the gutter for draining the moisture collected in gutter an exhaust port extending generally horizontally through one of the hood sides and hood ends above the level of the gutter;

moisture-collecting means having a hollow central portion and an inlet and outlet, each of a smaller cross-sectional area than the central portion for communication therewith, the inlet coupled to the exhaust port and the outlet coupled to an exhaust line that is negatively pressurized so that vapor in the hood will be exhausted through the moisture-collecting means and into the exhaust line while moisture in the exhausted vapor that condenses inside of the central portion will be collected at its bottom; and second drainage means coupled to the bottom of the central portion of the moisture-collecting means for draining away the collected moisture.

2. The moisture-collecting hood assembly according to claim 1 wherein the second drainage means comprises:

a drain port coupled to the bottom of the central portion of the moisture-collecting means;

a drain trap coupled to the drain port via a connecting piece; and a drain tube coupled to the drain trap.

3. The moisture-collecting hood assembly according to claim 1 wherein each of the sides and ends of the hood is comprised of a trapezoidal metal panel, and wherein a gutter is formed on each side and end by bending a portion of each panel near its bottom, and wherein the panels are joined to each other at their edges so that the gutter formed on each panel is continuous with the gutter on each adjacent panel.

4. The moisture-collecting hood assembly according to claim 3 wherein the panels are stainless steel.

5. The moisture-collecting hood assembly according to claim 1 wherein the first drainage means comprises:

a second drain port coupled to the gutter; and a second drain tube coupled to the second drain port.

6. A moisture-collecting assembly for collecting moisture in vapor evacuated from a hood through an exhaust port into a negatively pressurized exhaust line, comprising:

a sleeve having a hollow central portion with a bottom, first and second tapered portions, and an inlet and outlet, each of a smaller cross-sectional area than the central portion and coupled thereto by a respective one of the first and second tapered portions so the inlet and outlet are each at an identical prescribed height above the bottom of the hollow central portion, the inlet coupled to the exhaust port and the outlet coupled to the exhaust line so that vapor in the hood will be exhausted through the sleeve and into the exhaust line while moisture in the exhausted vapor that condenses inside the sleeve will be collected within the central portion at its bottom; and drainage means coupled to the bottom of the central portion of the sleeve means for draining away the collected moisture.

\* \* \* \* \*